Jan. 9, 1951  J. N. BECK  2,537,809
STEAM TRAP
Filed Oct. 28, 1947

Inventor:
John N. Beck
by his Attorneys
Howson & Howson

Patented Jan. 9, 1951

2,537,809

UNITED STATES PATENT OFFICE 2,537,809

STEAM TRAP

John N. Beck, Radnor, Pa., assignor to Watson-McDaniel Co., Philadelphia, Pa., a corporation of Pennsylvania Application October 28, 1947, Serial No. 782,591

5 Claims. (Cl. 236—54)

This invention relates to new and useful improvements in steam traps, and more particularly to steam traps which operate automatically to discharge air and water-of-condensation collecting therein.

One object of the present invention is to provide a steam trap of the type described having a discharge valve which operates entirely free of any springs.

Another object of the invention is to provide a steam trap having a discharge valve as set forth which is operatively controlled by means of a pilot valve actuated in response to fluctuation in temperature within the trap.

A further object of the invention is to provide a steam trap of the character described having novel features of construction and arrangement of the pilot valve and its temperature responsive control means whereby substantially instantaneous closing of the discharge valve is effected with no resulting loss of steam.

Still a further object of the invention is to provide a steam trap embodying the foregoing features and characteristics which is relatively simplified in its construction, comparatively inexpensive to manufacture, and highly efficient and effective in operation and use.

Figure 1:
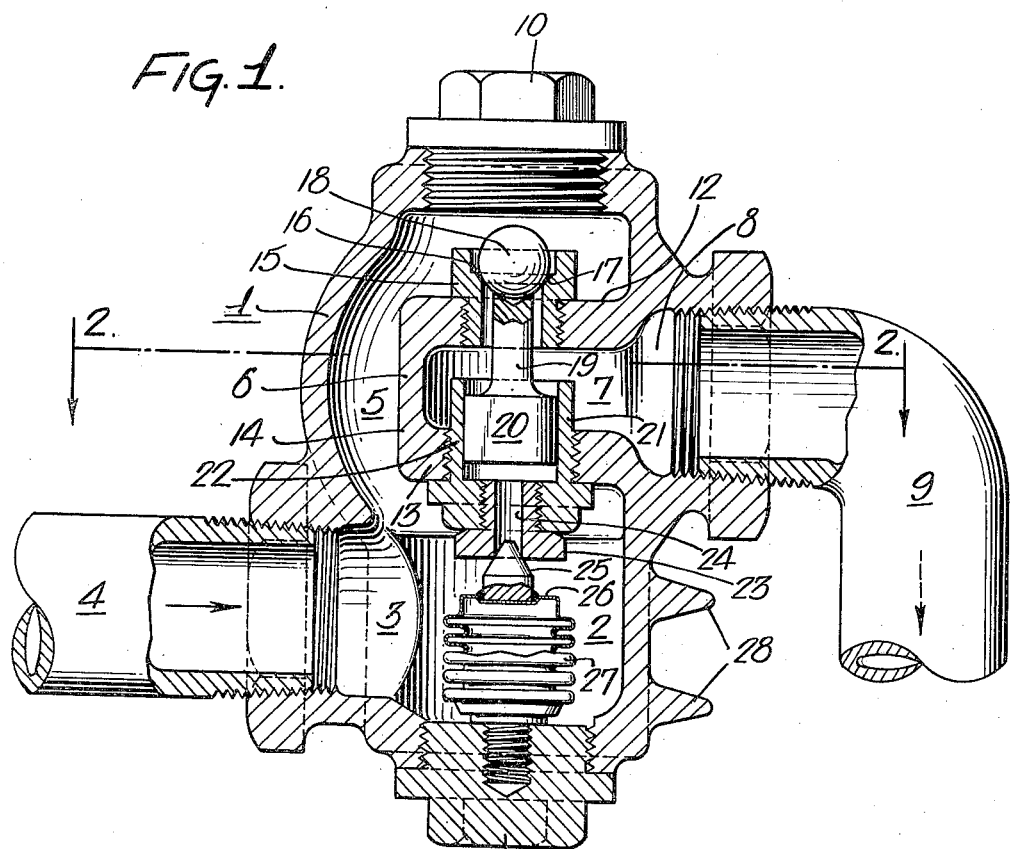
Figure 2:
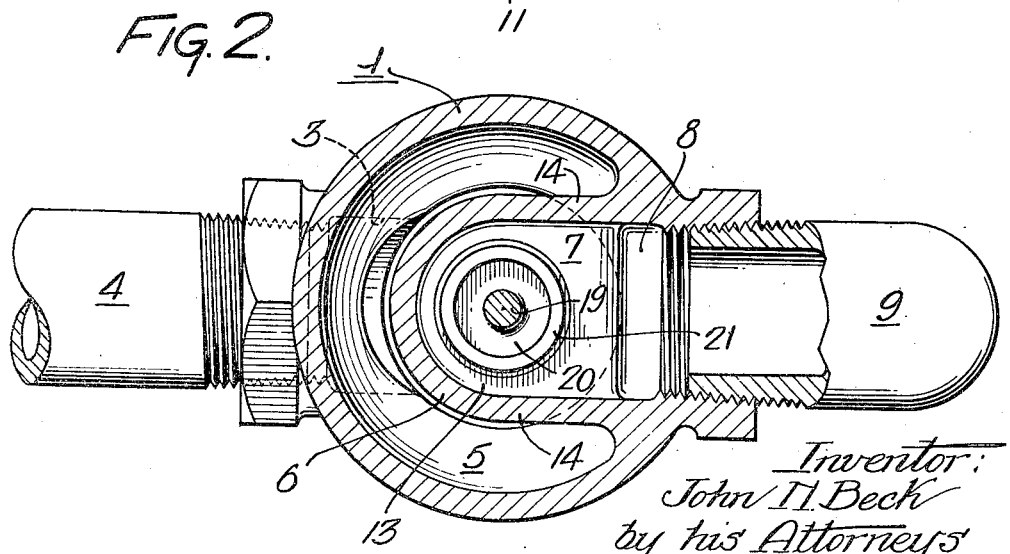

These and other objects of the invention and the various features and details of the construction and operation thereof, are hereinafter fully set forth and described with reference to the accompanying drawing, in which:

Fig. 1 is a sectional view vertically through a steam trap embodying the present invention; and Fig. 2 is a sectional view taken on line 2—2, Fig. 1.

Referring now more particularly to the drawing, a steam trap made according to the present invention comprises a casing 1 which provides in the lower portion thereof a receiving chamber 2 having an inlet 3 to which is connected the pipe 4 of a steam system. Above the receiving chamber 2, the casing 1 provides a generally spherical main chamber 5 and projecting laterally into this main chamber 5, substantially centrally thereof, is a wall 6 which is formed integral with the casing 1 and defines therewithin a discharge chamber 7 having an outlet 8 opening laterally through the casing 1. To this outlet 8 a pipe 9 usually is connected for carrying away the water-of-condensation discharged from the trap. Threaded clean-out and access plugs 10 and 11 are provided in the upper and lower ends, respectively, of the casing 1 and arranged coaxially thereof.

As shown in the drawing, the inwardly projecting casing wall 6 includes vertically spaced horizontally disposed upper and lower portions 12 and 13, respectively, and an enclosing vertical wall portion 14. Preferably the upper and lower horizontal wall portions 12 and 13 are of substantially greater thickness than the vertical wall portion 14 in order to provide adequate support for the main valve assembly now to be described.

Threaded into the upper horizontal wall portion 12 and arranged coaxially of the casing 1 is a sleeve 15 which has its upper end counterbored to provide a laterally extending internal shoulder 16. This shoulder 16 has its inner edge beveled as indicated at 17 to provide a continuous circular seat for a valve element 18 of generally spherical configuration which is arranged to rest freely on said seat.

Underlying the spherical valve element 18 is the upper end of a piston rod or stem 19 which terminates at its lower end in a cylindrical piston portion 20. The piston 20 is of substantially greater area than the area of the valve seat 17 and is slidably received within the cylinder portion 21 of a sleeve member 22 which is threaded into the lower horizontal wall portion 13 in coaxial relation with respect to the casing 1.

Threaded into the sleeve member 22 and arranged coaxially of the casing 1 is a pilot valve sleeve 23 having a bore 24 extending coaxially therethrough and opening at its upper end into the cylinder 21 beneath the piston 20 therein. The lower end of the bore 24 communicates with the receiving chamber 2 and, therefore, when the bore 24 is open the underside of the piston 20 is subjected to the fluid pressure existing in the said receiving chamber. It is to be noted that the fit of the piston 20 within the cylinder 21 provides a predetermined leakage clearance about the piston 20 so that, when the bore 24 is closed, pressure trapped beneath the piston 20 is quickly dissipated or relieved to permit downward travel of the piston 20 and seating of the valve 18 on its seat 17.

In accordance with the present invention, communication between the chamber 2 and cylinder 21 through the bore or passage 24 is controlled by a pilot valve element 25 which may be of generally conical configuration and adapted to engage inwardly of the lower end opening of the bore 24 in the relation shown in Fig. 1 of the drawing. Opening and closing of the element 25 with respect to the bore 24 is accomplished in response to fluctuations in temperature in the receiving chamber 2 and, to this end, the pilot valve element 25 is secured upon the upper end face 26 of a temperature responsive thermostat element 27 of the expansible-contractible bellows type. The bellows element 27 has its lower end removably anchored in the casing plug 11 so that it may be removed readily with said plug when necessary. The bellows 27 is constructed, arranged and calibrated so that at the temperature of steam it is expanded sufficiently to close the pilot valve 25 with respect to the bore 24 and at temperatures just slightly under the temperature of steam it contracts to thereby open the valve 25 with respect to said bore 24.

The steam trap of the present invention operates to relieve air from a system when steam first enters the system and thereafter intermittently to discharge from the system water-of-condensation collecting in the trap. At the start of operation in a system into which steam is just being admitted the temperature of the air in the chamber 2 is below the temperature of steam and hence bellows 27 is contracted and the pilot valve 25 open with respect to the bore 24. Under these conditions air initially will be relieved through the leakage clearance provided between the piston 20 and its cylinder 21 and discharged outwardly of the trap through chamber 7, outlet 8 and pipe 9. However, as the system fills with steam and the pressure of the air in the trap increases above a predetermined value, and since the area of the piston 20 is greater than the area of the main valve seat 17, the piston 20 will be actuated upwardly to open the main valve 18 through which the air passes to the discharge chamber 7 and thence outwardly of the trap.

As the last of the air is discharged from the system and steam enters the trap chamber 2 from the pipe 4, the bellows 27 immediately expands and thereby closes the pilot valve 25 substantially instantaneously whereupon the pressure trapped beneath the piston 20 is dissipated immediately as previously described with the result that the pressure in the main chamber 5 and above the main valve 18 will be very much greater than the pressure beneath the piston so that the latter and the main valve 18 are forced downwardly thereby to seat and close the valve 18 against further discharge.

Continued operation of the system produces water-of-condensation which collects in the trap chamber 2. As this water cools to a temperature just slightly below the temperature of steam, the bellows 27 contracts sufficiently to open the pilot valve 25 so that the water-of-condensation bleeds outwardly between the piston 20 and cylinder 21 or through the main valve 18 in the manner previously described in connection with air, depending upon the pressure of the condensation within the trap. Cooling of the water-of-condensation in the chamber 2 may be speeded-up by providing heat radiating fins 28 on the exterior of the casing 1 in circumscribing relation to the said chamber 2.

When the bulk of the water-of-condensation has been discharged as described and steam again enters the chamber 2, the bellows 27 immediately expands to close the pilot valve 25 and thereby effectuate a closing of the main valve 18. Closing of the main valve 18 is substantially instantaneous due to the velocity of condensate passing therethrough and the free seating of the said valve. The result of this is that steam actually never reaches the main valve port and hence a water seal is maintained over the main valve 18. Thus, there is no steam loss whatever.

By constructing a steam trap as herein shown and described, it will be observed that the temperature responsive pilot valve actuating means is disposed directly in the receiving chamber of the trap adjacent the inlet thereto where it is immediately subjected to any changes in temperature occurring during operation of the trap. With this arrangement, and employing a sensitive thermostat as described, there is no apparent lag in the operation of the trap as changes in temperature occur.

From the foregoing description it will be apparent that the present invention provides a novel steam trap having a discharge valve which operates entirely free from any springs. The invention also provides a novel steam trap having a discharge valve which is operatively controlled by means of a pilot valve actuated in response to fluctuations in temperature within the trap. Furthermore, the invention provides a steam trap as set forth embodying novel construction and arrangement of pilot valve temperature responsive control means therefor which is operable to effect substantially instantaneous closing of the discharge valve with no accompanying loss of steam from the system. In addition, the invention provides a steam trap embodying the foregoing features and characteristics which is relatively simplified in construction, comparatively inexpensive to manufacture and highly efficient and effective in operation and use.

While a particular embodiment of the invention has been illustrated and described herein, it is not intended to limit the invention to such disclosure and changes and modifications may be made therein and thereto within the scope of the following claims.

I claim:

1. A steam trap comprising a casing defining a main chamber, and a receiving chamber provided with an inlet, and having an integral wall portion including spaced, substantially parallel walls and extending inwardly of said main chamber and defining a discharge chamber having an outlet, means in one of said spaced, substantially parallel casing walls having a port for the passage of fluid from said main chamber to said discharge chamber and providing a circular valve seat circumscribing said port at the main chamber side thereof, a ball valve arranged to seat freely on said valve seat and close said port, a piston of greater area than said ball valve to actuate the latter and slidable in a cylinder secured in the other spaced, substantially parallel wall of said casing wall, means providing a fluid passage from the receiving chamber to the cylinder, a temperature responsive expandable-contractible element mounted in the receiving chamber of the casing adjacent the inlet thereto, and a pilot valve actuable by said element into and out of closing relation with the passage communicating from the receiving chamber to said cylinder for controlling passage of fluid thereto.

2. A steam trap comprising a casing defining a main chamber, and a receiving chamber provided with an inlet, and having an integral wall portion including spaced, substantially parallel walls and extending inwardly of said main chamber and defining a discharge chamber having an outlet, means in one of said spaced, substantially parallel casing walls having a port for the passage of fluid from said main chamber to said discharge chamber and providing a circular valve seat circumscribing said port at the main chamber side thereof, a ball valve arranged to seat freely on said valve seat and close said port, a piston of greater area than said ball valve to actuate the latter and slidable in a cylinder secured in the other spaced, substantially parallel wall of said casing wall and opening interiorly of the discharge chamber, said cylinder and piston having their inner and outer walls spaced to provide a predetermined clearance between them to effect rapid dissipation into the discharge chamber of fluid pressure trapped in said cylinder at the opposite side of the piston from said discharge chamber, means providing a fluid passage from the receiving chamber to the cylinder at said opposite side of the piston therein, a temperature responsive expandable-contractible element mounted in the receiving chamber of the casing adjacent the inlet thereto, and a pilot valve actuable by said element into and out of closing relation with the communicating passage from the receiving chamber to said cylinder for controlling passage of fluid thereto.

3. A steam trap comprising a casing defining a main chamber, and a receiving chamber provided with an inlet, and including an integral vertical wall portion and relatively vertically spaced horizontal wall portions extending inwardly of said main chamber and defining a discharge chamber having an outlet, means in the upper of said horizontal wall portions having a port for the passage of fluid from said main chamber to said discharge chamber and providing a circular valve seat circumscribing said port at the main chamber side thereof, a vertically movable ball valve arranged to seat freely on said valve seat and close said port, a vertically movable piston of greater area than said ball valve to actuate the latter and slidable in a vertically disposed cylinder secured in the lower of said horizontal wall portions in coaxial alignment with said port and opening interiorly of the discharge chamber, said cylinder and piston having their inner and outer walls spaced to provide a predetermined clearance between them to effect relatively rapid dissipation into the discharge chamber of fluid pressure trapped in said cylinder at the opposite side of the piston from said discharge chamber when the flow of fluid from said receiving chamber to said cylinder is stopped and the ball valve is closing, means providing a fluid passage from the receiving chamber to the cylinder at said opposite side of the piston therein, and means operable to control the passage of fluid from said receiving chamber to said cylinder to open and close said ball valve according to temperature conditions existing in the receiving chamber.

4. A steam trap comprising a casing defining a main chamber, and a receiving chamber provided with an inlet and including an integral vertical wall portion and relatively vertically spaced horizontal wall portions extending inwardly of said main chamber and defining a discharge chamber having an outlet, means in the upper of said horizontal wall portions having a port for the passage of fluid from said main chamber to said discharge chamber and providing a circular valve seat circumscribing said port at the main chamber side thereof, a vertically movable ball valve arranged to seat freely on said valve seat and close said port, a vertically movable piston of greater area than said ball valve to actuate the latter and slidable in a vertically disposed cylinder secured in the lower of said horizontal wall portions in coaxial alignment with said port and opening interiorly of the discharge chamber, said cylinder and piston having their inner and outer walls spaced to provide a predetermined clearance between them to effect relatively rapid dissipation into the discharge chamber of fluid pressure trapped in said cylinder at the opposite side of the piston from said discharge chamber when the flow of fluid from said receiving chamber to said cylinder is stopped and the ball valve is closing, means providing a fluid passage from the receiving chamber to the cylinder at said opposite side of the piston therein, a temperature responsive expandable-contractible element mounted in the receiving chamber of the casing adjacent the inlet thereto, and a pilot valve actuable by said element into and out of closing relation with said passage communicating from the receiving chamber to said cylinder for controlling passage of fluid thereto.

5. A steam trap comprising a casing defining a main chamber, and a receiving chamber provided with an inlet, and including an integral vertical wall portion and relatively vertically spaced horizontal wall portions extending inwardly of said main chamber and defining a discharge chamber having an outlet, means in the upper of said horizontal wall portions having a port for the passage of fluid from said main chamber to said discharge chamber and providing a circular valve seat circumscribing said port at the main chamber side thereof, a vertically movable ball valve arranged to seat freely on said valve seat and close said port, a vertically movable piston of greater area than said ball valve to actuate the latter and slidable in a vertically disposed cylinder secured in the lower of said horizontal wall portions in coaxial alignment with said port and opening interiorly of the discharge chamber, said cylinder and piston having their inner and outer walls spaced to provide a predetermined clearance between them to effect relatively rapid dissipation into the discharge chamber of fluid pressure trapped in said cylinder at the opposite side of the piston from said discharge chamber when the flow of fluid from said receiving chamber to said cylinder is stopped and the ball valve is closing, means providing a fluid passage from the receiving chamber to the cylinder at said opposite side of the piston therein, a temperature responsive expandable-contractible bellows element mounted in the receiving chamber of the casing adjacent the inlet thereto, and a pilot valve actuable by said bellows element into and out of closing relation with said passage communicating from the receiving chamber to said cylinder for controlling passage of fluid thereto, said bellows being constructed and arranged to operate below a predetermined temperature in said receiving chamber to open the pilot valve for the passage of fluid to the cylinder to actuate the piston and open the ball valve and to operate above said predetermined temperature to close the pilot valve and effect rapid closing of the ball valve through dissipation of pressure trapped in the cylinder and fluid pressure exerted on said ball valve from within the main chamber of the casing.

JOHN N. BECK.

(References on following page)

REFERENCES CITED

The following references are of record in the file of this patent:

UNITED STATES PATENTS

| Number | Name | Date |
|---|---|---|
| 312,077 | Bowen | Feb. 10, 1885 |
| 688,283 | Bickel | Dec. 10, 1901 |
| 917,301 | Hurst | Apr. 6, 1909 |
| 1,540,214 | Hudson | June 2, 1925 |
| 2,163,667 | Crowther | June 27, 1939 |
| 2,171,240 | Hinsch | Aug. 29, 1939 |

FOREIGN PATENTS

| Number | Country | Date |
|---|---|---|
| 22,434 | Great Britain | of 1897 |